United States Patent
Garabello et al.

(10) Patent No.: US 8,413,537 B2
(45) Date of Patent: Apr. 9, 2013

(54) MOTOR VEHICLE GEARBOX

(75) Inventors: Marco Garabello, Orbassano (IT);
Valter Pastorello, Orbassano (IT);
Andrea Piazza, Orbassano (IT)

(73) Assignee: C.R.F. Societa Consortile per Azioni, Orbassano (Torino) (IT)

( * ) Notice: Subject to any disclaimer, the term of this patent is extended or adjusted under 35 U.S.C. 154(b) by 1138 days.

(21) Appl. No.: 12/251,941

(22) Filed: Oct. 15, 2008

(65) Prior Publication Data

US 2009/0107279 A1    Apr. 30, 2009

(30) Foreign Application Priority Data

Oct. 24, 2007   (EP) .................................. 07425667

(51) Int. Cl.
*B60K 20/00* (2006.01)
*F16H 63/32* (2006.01)
*F16H 59/04* (2006.01)
(52) U.S. Cl. .................. 74/473.37; 74/473.36
(58) Field of Classification Search ............... 74/473.36, 74/473.37, 473.1, 335, 606 R, 339
See application file for complete search history.

(56) References Cited

U.S. PATENT DOCUMENTS

| | | | | |
|---|---|---|---|---|
| 2,962,914 | A * | 12/1960 | Peras ......................... | 74/473.26 |
| 4,529,080 | A * | 7/1985 | Dolan ........................ | 192/109 A |
| H0295 | H * | 7/1987 | Numazawa et al. ....... | 74/473.37 |
| 6,450,057 | B1 * | 9/2002 | Winkler et al. ............ | 74/473.37 |
| 6,845,685 | B2 * | 1/2005 | Brandwitte et al. ....... | 74/473.25 |
| 7,841,253 | B2 * | 11/2010 | Uberti et al. .................... | 74/335 |
| 7,942,075 | B2 * | 5/2011 | Garabello et al. .......... | 74/473.37 |
| 8,037,780 | B2 * | 10/2011 | Caenazzo et al. .......... | 74/473.37 |
| 2007/0209466 | A1* | 9/2007 | Garabello et al. .......... | 74/473.37 |
| 2008/0134825 | A1* | 6/2008 | Caenazzo et al. .......... | 74/473.21 |

FOREIGN PATENT DOCUMENTS

| | | |
|---|---|---|
| EP | 1 655 518 A1 | 5/2006 |
| EP | 1 832 786 A1 | 9/2007 |
| JP | 59-108125 A | 6/1984 |
| JP | 60-215426 A | 10/1985 |

* cited by examiner

*Primary Examiner* — Robert Pezzuto
*Assistant Examiner* — Matthew D Troutman
(74) *Attorney, Agent, or Firm* — Sughrue Mion, PLLC

(57) ABSTRACT

The gearbox comprises a case, a stationary rod supported by the case, a gear selector fork mounted slidably on the stationary rod and an end-of-travel bush mounted on the stationary rod so as to provide an axial abutment surface for the gear selector fork. The gear selector fork includes a sheet-metal body forming integrally a pair of support plates each having a respective guide through-hole. One of the guide through-holes is provided with a guide bush formed by means of overmoulding of low-friction plastic and is guided along the stationary rod. The other guide through-hole has no guide bush and is guided along a smaller-diameter portion of the end-of-travel bush.

11 Claims, 3 Drawing Sheets

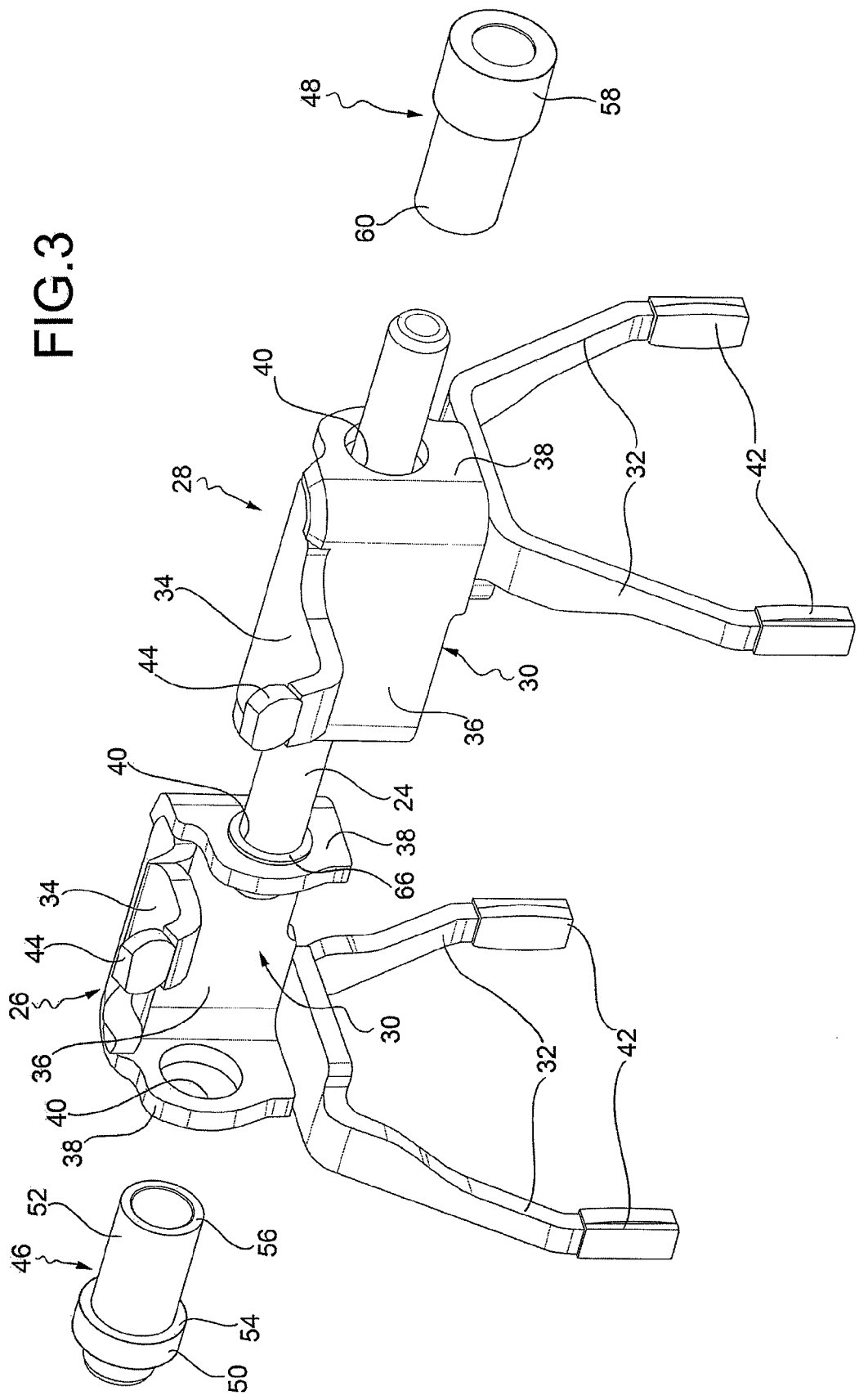

MOTOR VEHICLE GEARBOX

BACKGROUND OF THE INVENTION

The present invention relates to a motor vehicle gearbox and more specifically to the arrangement of the gear selector forks on the respective stationary rods.

Japanese Patent Application JP59108125 discloses a gear selector fork supported on a sliding rod with the arrangement of a pair of double-diameter bushes in between. A helical spring is axially arranged between the two bushes and exerts on them a resilient force tending to move them away from each other. The two bushes are constrained in an axially outward direction by respective snap rings mounted on the rod. Actuation of the selector fork by the sliding rod therefore produces a relative displacement, dampened by the helical spring, between the two components.

Unpublished European Patent Application 06425825.4 in the name of the Applicant discloses a motor vehicle gearbox comprising a case, a stationary rod supported by the case, a pair of gear selector forks mounted slidably on the rod and end-of-travel members arranged on the rod so as to define the end-of-travel positions of the gear selector forks, the end-of-travel members comprising a pair of bushes which are separate from the rod and each have a first axially external portion with a larger diameter and a second axially internal portion with a smaller diameter so as to define at least one axial abutment surface for the adjacent gear selector fork.

European Patent Application EP 1 832 786 in the name of the Applicant also discloses a gear selector fork for a motor vehicle gearbox comprising a body designed to support the fork slidably along a stationary rod of the gearbox, a pair of prongs projecting from the body and forming at their distal ends respective actuating portions able to operate a coupling sleeve of the gearbox, and an actuating nose fixed to the body so as to impart to the fork the sliding movement along the rod. The body, the prongs and the actuating nose are formed by sheet-metal parts obtained by means of blanking and bending and fixed to each other by means of welding. The body of the fork includes a central plate and a pair of support plates which extend at right angles from the opposite ends of the central plate and have respective coaxial through-holes able to guide the fork along the rod. Both the through-holes in the fork support plates are provided with respective plastic bushes having the function of reducing friction and wear. The bushes are advantageously obtained by means of plastic overmoulding so as to avoid the need to perform additional machining of the fork.

SUMMARY OF THE INVENTION

The object of the present invention is to propose a motor vehicle gearbox, having an arrangement of the gear selector forks such as to minimize the costs of manufacture of the gearbox, while at the same time fulfilling the necessary requirements in terms of duration and performance.

This and other objects are fully achieved according to the invention by means of a gearbox comprising a case, a stationary rod supported by the case, a gear selector fork mounted slidably on the stationary rod and an end-of-travel bush mounted on the stationary rod so as to provide an axial abutment surface for the gear selector fork, the gear selector fork including a pair of support plates each having a respective guide through-hole, wherein one of said guide through-holes of the gear selector fork is provided with a guide bush and is guided along the stationary rod and the other of said guide through-holes of the gear selector fork has no guide bush and is guided along a portion of the end-of-travel bush.

Further advantageous characteristics of the invention are specified in the dependent claims.

BRIEF DESCRIPTION OF THE DRAWINGS

The characteristics and advantages of the invention will emerge clearly from the detailed description which follows, provided purely by way of a non-limiting example with reference to the accompanying drawings in which:

FIG. 3 is a perspective view which shows an example of a non-superimposed arrangement of two gear selector forks in a motor vehicle gearbox according to a variant of the present invention.

DETAILED DESCRIPTION OF THE PREFERRED EMBODIMENTS

In the description which follows, the terms "left-hand" and "right-hand" in each case refer to the standpoint of a person viewing the figure in question and are used purely for the purposes of facilitating understanding of what is shown in the figure. They must therefore not be understood as being limiting in any way. Moreover, the terms "axial" and "axially" must be understood as referring to the axis of the stationary rod of the gearbox, on which the gear selector forks are slidably mounted.

Moreover, the following description will explain in detail only the gear shift mechanism, or more precisely only the part of the gear shift mechanism comprising a pair of gear selector forks and a stationary rod on which this pair of forks is mounted, without illustrating further constructional details of the gearbox. The basic idea of the invention is in fact applicable to any motor vehicle gearbox, independently of the number of input or output shafts, or of the number and the arrangement of the gears.

Figure 1:
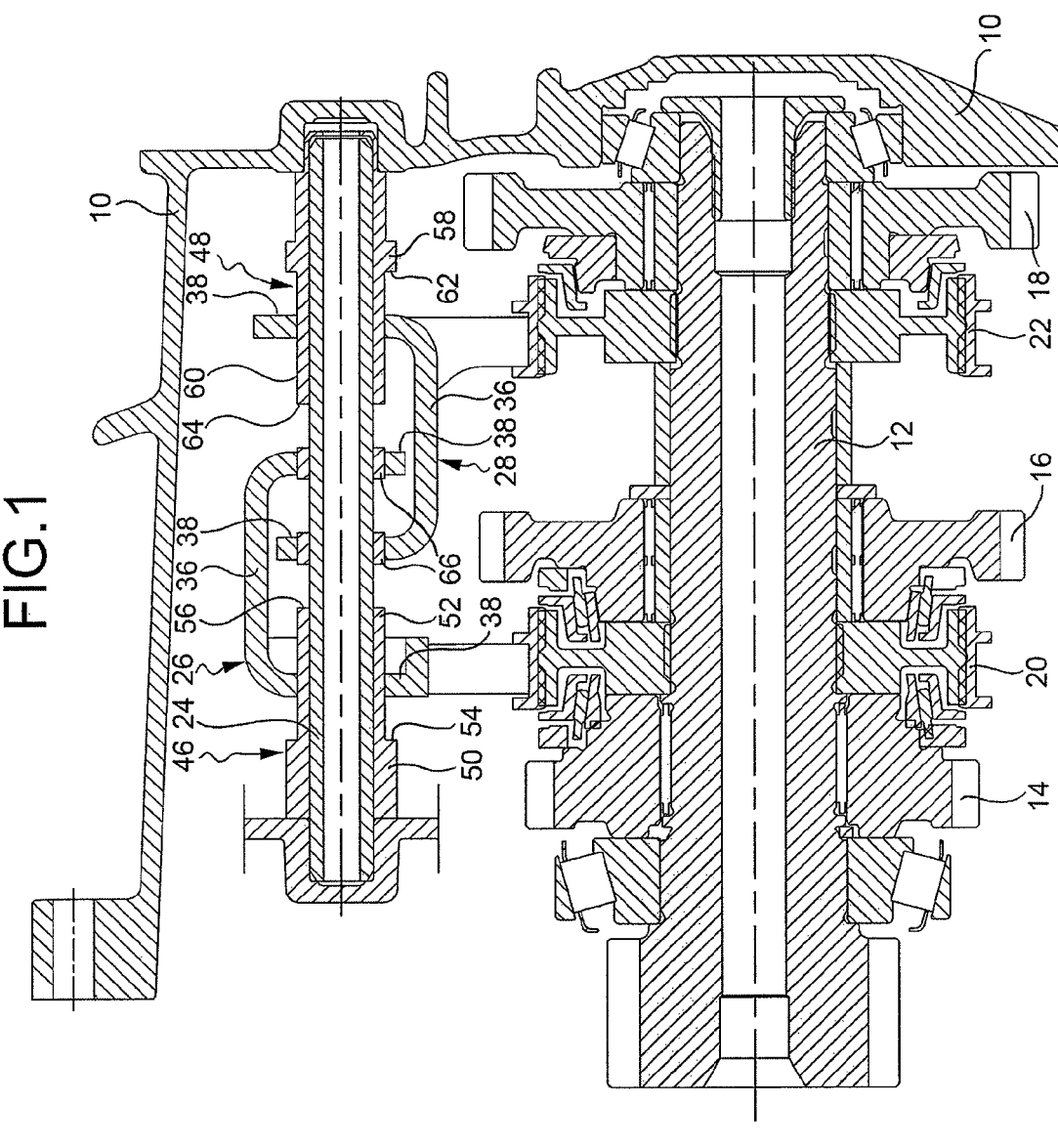
FIG. 1 is an axially sectioned view which shows schematically the arrangement of a pair of gear selector forks on the same stationary rod of a motor vehicle gearbox in accordance with a preferred embodiment of the present invention.
Figure 2:
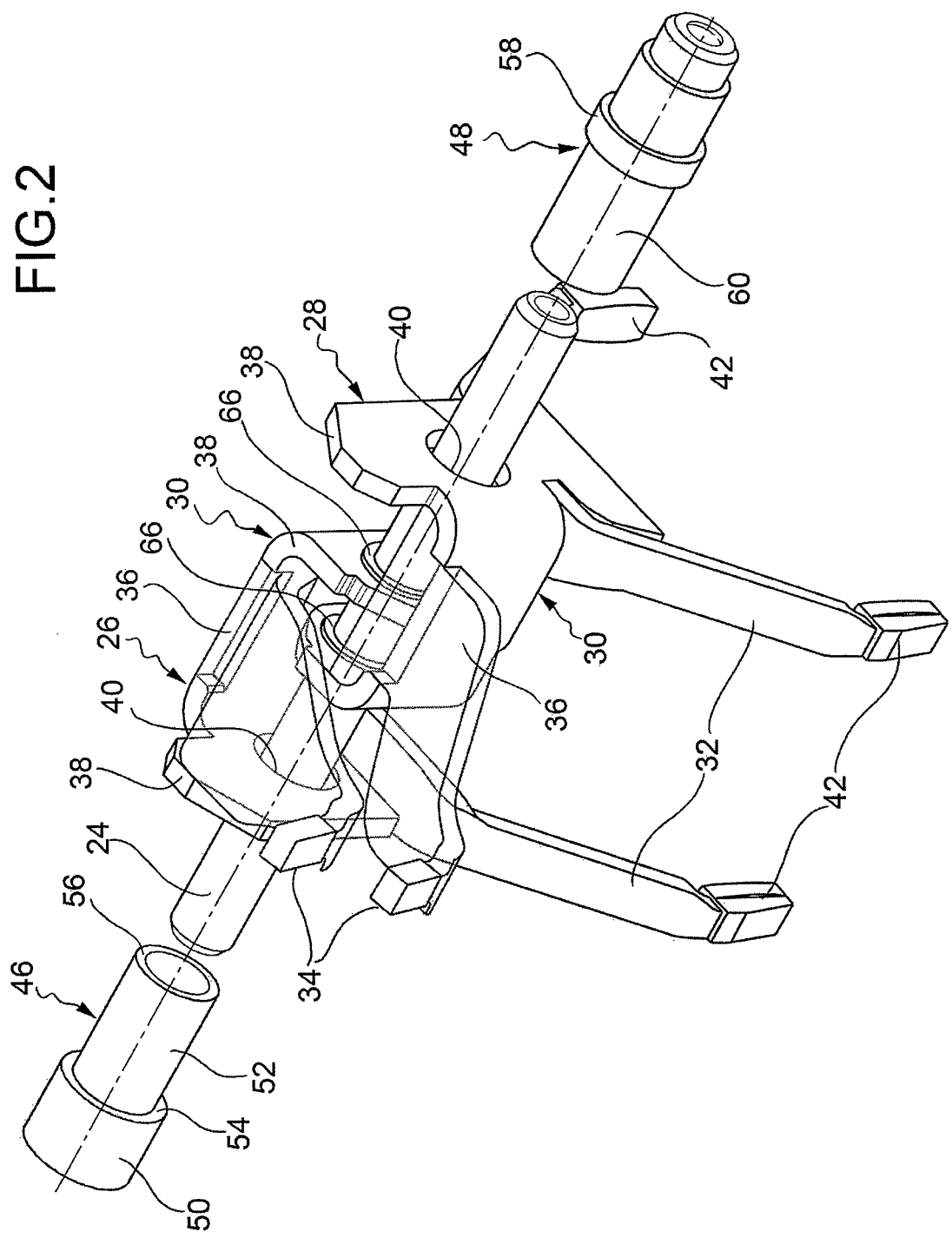
FIG. 2 is a perspective view which shows the arrangement of the gear selector forks of the gearbox according to FIG. 1.

With reference initially to FIGS. 1 and 2, a motor vehicle gearbox according to the present invention comprises a case 10, an output shaft 12 supported by the case 10 and carrying a plurality of idle gearwheels (in the example shown three gearwheels 14, 16 and 18) each associated with a given gear, a pair of coupling sleeves 20 and 22—mounted slidably on the output shaft 12—the first one of which is arranged to couple rotationally together the idle gearwheels 14 and 16 and the second one of which is arranged to couple rotationally together the remaining idle gearwheel 18 with the output shaft 12, a stationary rod 24 supported by the case 10 and extending parallel to and at a distance from the output shaft 12, and a pair of gear selector forks 26 and 28, the first one of which is arranged to actuate the coupling sleeve 20 and the second one of which is arranged to actuate the coupling sleeve 22.

With reference in particular to FIG. 2, the two gear selector forks 26 and 28 each comprise a body 30 arranged to support the fork slidably along the stationary rod 24, a pair of prongs 32 fixed to the body 30 and an actuating nose 34 fixed to the body 30. The body 30, the prongs 32 and the actuating nose 34 are advantageously formed as separate sheet-metal parts which are obtained by means of blanking and bending and are fixed to each other by means of welding. The body 30 has a generally U-shaped configuration, with a central plate 36 and with a pair of support plates 38 which extend from the opposite longitudinal ends of the central plate 36, at right angles with respect to the latter, and lie in a transverse plane (or vertical plane from the standpoint of a person viewing FIGS. 1 and 2). The support plates 38 have respective coaxial through-holes 40 able to guide the fork along the axis of the stationary rod 24. The two prongs 32 are advantageously formed by a single sheet-metal part welded to one of the two support plates 38 in the zone situated underneath the guide hole 40. The prongs 32 extend in a transverse plane, namely in a plane parallel to the plane of the support plate 38 to which they are fixed, on the same side as the zone where they are fixed to the support plate 38, relative to the sliding axis defined by the two guide holes 40. The distal ends of the prongs 32 have a finger-like form so as to operate the respective coupling sleeves 20, 22 of the gearbox and are advantageously provided with a coating 42 of plastic material, preferably formed by means of overmoulding and having the function of reducing wear. The actuating nose 34 is welded to the body 30 on the opposite side of the axis of the stationary rod 24 to the two prongs 32. The free end of the actuating nose 34 has a finger-like form so as to engage inside a special seat of the gear lever (not shown) and is advantageously provided with a coating of plastic material formed by means of overmoulding and having the function of reducing wear.

As can be noted in particular in FIG. 2, the two gear selector forks 26 and 28 have identical body 30 and prongs 32 and differ from each other only in terms of the actuating nose 34. Moreover, the body 30 of the two gear selector forks 26 and 28 is formed so as to allow a partial superimposed arrangement of the two forks in the direction of sliding along the stationary rod 24. In particular, this arrangement is allowed by the fact that the central plate 36 is arranged asymmetrically with respect to the plane of symmetry of the two prongs 32 passing through the sliding axis (axis of the through-holes 40), namely on the side of one of the two prongs relative to this plane. This partially superimposed arrangement of the forks allows the overall axial dimensions of the assembly of the two forks to be limited, ensuring at the same time suitable mounting on the stationary rod, namely an adequate distance between the two support plates.

The stationary rod 24 has, mounted thereon, a pair of end-of-travel members formed as bushes, advantageously made of low-friction plastic and each forming at least one axial abutment surface for stopping a respective gear selector fork in a given end-of-travel position. More specifically, the stationary rod 24 supports at its left-hand end a first end-of-travel bush 46 able to define, for each of the two gear selector forks 26 and 28 mounted on this rod, the left-hand end-of-travel position of the engaging movement and at its right-hand end a second end-of-travel bush 48 able to define, for each of the two gear selector forks 26 and 28 mounted on this rod, the right-hand end-of-travel position of the engaging movement.

Each of the two end-of-travel bushes 46 and 48 is preferably formed as a double-diameter bush so as to form a first axial abutment surface for a selector fork and a second axial abutment surface for the other selector fork. More specifically, the first end-of-travel bush 46 (left-hand bush) has a first larger-diameter portion 50 and a second smaller-diameter portion 52 respectively directed towards the axially outer side and towards the axially inner side of the stationary rod 24. In this way, the bush 46 forms a first axially outer abutment surface 54, intended to co-operate with the left-hand support plate 38 of the first selector fork 26 so as to define the left-hand end-of-travel position of this fork, and a second axially inner abutment surface 56, intended to co-operate with the left-hand support plate 38 of the second selector fork 28 so as to define the left-hand end-of-travel position of this fork. Similarly, the second end-of-travel bush 54 (right-hand bush) has a first larger-diameter portion 58 and a second smaller-diameter portion 60 respectively directed towards the axially outer side and towards the axially inner side of the stationary rod 24. In this way, the bush 48 forms a first axially outer abutment surface 62, intended to co-operate with the right-hand support plate 38 of the second selector fork 28 so as to define the right-hand end-of-travel position of this fork, and a second axially inner abutment surface 64, intended to co-operate with the right-hand support plate 38 of the first selector fork 26 so as to define the right-hand end-of-travel position of this fork. The two end-of-travel bushes 46 and 48 are preferably identical to each other so as to reduce the number of different components in the gearbox.

According to the invention, only one of the two coaxial through-holes 40 of each of the two gear selector forks 26 and 28 is provided with a low-friction plastic guide bush 66, preferably formed by means of overmoulding. More specifically, only the through-hole 40 of the support plate 38 guided along the stationary rod 24, namely the support plate directed towards the axially inner side of the rod, is provided with a guide bush. The other through-hole 40 instead has no guide bush, this hole being guided on the smaller-diameter portion 52 or 60 of the end-of-travel bush 46 or 48, respectively, which is made of low-friction plastic. In this way a guide bush for each selector fork is avoided and consequently the manufacturing costs are reduced.

The invention is also clearly applicable to a gearbox having a non-superimposed arrangement of the gear selector forks, as in the embodiment shown in FIG. 3, where the same reference numbers indicate parts and elements which are identical or correspond to those of FIGS. 1 and 2.

With reference to FIG. 3, the through-hole 40 of the left-hand support plate 38 of the gear selector fork 26 is guided along the smaller-diameter portion 52 of the end-of-travel bush 46 and therefore has no guide bush, while the through-hole 40 of the right-hand support plate 38 of the same gear selector fork is guided along the stationary rod 24 and is therefore provided with the guide bush 66 made of low-friction plastic. Similarly, the through-hole 40 of the right-hand support plate 38 of the gear selector fork 28 is guided along the smaller-diameter portion 60 of the end-of-travel bush 48 and therefore has no guide bush, while the through-hole 40 of the left-hand support plate 38 of the same gear selector fork is guided along the stationary rod 24 and therefore is provided with the guide bush 66 made of low-friction plastic.

Obviously, the principle of the invention remaining unchanged, the embodiments and constructional details may be widely varied with respect to those described and illustrated purely by way of a non-limiting example.

What is claimed is:

1. A motor vehicle gearbox comprising:
a case,
a stationary rod supported by the case,
a gear selector fork mounted slidably on the stationary rod and
an end-of-travel bush mounted on the stationary rod so as to provide an axial abutment surface for the gear selector fork, the gear selector fork including a pair of support plates each having a respective guide through-hole,
wherein one of said guide through-holes of the gear selector fork is provided with a guide bush and is guided along the stationary rod and the other of said guide through-holes of the gear selector fork has no guide bush and is guided along a portion of the end-of-travel bush.

2. The motor vehicle gearbox according to claim 1, wherein the end-of-travel bush is made of plastic.

3. The motor vehicle gearbox according to claim 1, wherein the guide bush is made of plastic.

4. The motor vehicle gearbox according to claim 3, wherein the guide bush is overmoulded onto the gear selector fork.

5. The motor vehicle gearbox according to claim 2, wherein both the end-of-travel bush and the guide bush are made of plastic.

6. The motor vehicle gearbox according to claim 1, wherein the end-of-travel bush comprises a first axially inner portion and a second axially outer portion, said second portion having a greater diameter than said first portion and the guide through-hole of the gear selector fork being guided along said first portion.

7. The motor vehicle gearbox according to claim 6, wherein said second portion of the end-of-travel bush forms an axial abutment surface defining the end-of-travel position for the gear selector fork.

8. The motor vehicle gearbox according to claim 1, wherein the gear selector fork includes a sheet-metal body forming integrally the two support plates.

9. The motor vehicle gearbox according to claim 1, further comprising another gear selector fork such that the gearbox includes a first gear selector fork and a second gear selector fork respectively mounted on the stationary rod, and first and second end-of-travel bushes respectively mounted on the ends of the stationary rod and associated respectively with the first and second gear selector forks, wherein one of the guide through-holes of each gear selector fork is provided with a guide bush and is guided along the stationary rod and the other one of the guide through-holes of each gear selector fork has not guide bush and is guided along a portion of the end-of-travel bush.

10. The motor vehicle gearbox according to claim 9, wherein the first and second selector fork have identical bodies.

11. The motor vehicle gearbox according to claim 10, wherein the support plate of the first selector fork directed axially inwards is arranged between the two support plates of the second selector fork.

* * * * *